United States Patent
Canepa et al.

(10) Patent No.: US 9,329,931 B2
(45) Date of Patent: May 3, 2016

(54) SOLID STATE DRIVE EMERGENCY PRE-BOOT APPLICATION PROVIDING EXPANDED DATA RECOVERY FUNCTION

(71) Applicant: LSI Corporation, San Jose, CA (US)

(72) Inventors: Timothy Canepa, Los Gatos, CA (US); Leonid Baryudin, San Jose, CA (US)

(73) Assignee: Seagate Technology LLC, Cupertino, CA (US)

( * ) Notice: Subject to any disclaimer, the term of this patent is extended or adjusted under 35 U.S.C. 154(b) by 122 days.

(21) Appl. No.: 14/047,239

(22) Filed: Oct. 7, 2013

(65) Prior Publication Data

US 2015/0033065 A1 Jan. 29, 2015

Related U.S. Application Data

(60) Provisional application No. 61/882,869, filed on Sep. 26, 2013, provisional application No. 61/857,758, filed on Jul. 24, 2013.

(51) Int. Cl.
*G06F 11/10* (2006.01)

(52) U.S. Cl.
CPC .................................. *G06F 11/1008* (2013.01)

(58) Field of Classification Search
CPC .............. G06F 11/1417; G06F 9/4416; G06F 11/1458; G06F 11/1008
See application file for complete search history.

(56) References Cited

U.S. PATENT DOCUMENTS

| | | | | |
|---|---|---|---|---|
| 6,560,701 B1 * | 5/2003 | Berstis | ................ | G06F 1/1417 713/2 |
| 6,625,809 B1 * | 9/2003 | Duff | ........................ | G06F 8/60 713/2 |
| 7,219,257 B1 * | 5/2007 | Mahmoud | ........... | G06F 11/1417 714/6.12 |
| RE41,011 E * | 11/2009 | Han | ........................ | G06F 9/441 711/152 |
| 8,103,908 B2 * | 1/2012 | Rothman | ............ | G06F 11/0793 714/15 |
| 8,219,793 B2 * | 7/2012 | Park | ...................... | G06F 9/4406 713/1 |
| 8,239,959 B2 * | 8/2012 | Gellerich | ........................ | 726/26 |
| 8,281,119 B1 * | 10/2012 | Spangler | ............... | G06F 9/4401 713/1 |
| 9,003,176 B1 * | 4/2015 | Yakovlev | .............. | G06F 21/575 713/1 |
| 9,098,448 B2 * | 8/2015 | Barajas | ............... | G06F 11/1417 |
| 2003/0182547 A1 * | 9/2003 | Kumagai | ............... | G06F 9/441 713/2 |
| 2004/0064457 A1 * | 4/2004 | Zimmer et al. | ............... | 707/100 |
| 2004/0158699 A1 * | 8/2004 | Rhoads | ................ | G06F 3/0607 713/1 |
| 2004/0172578 A1 * | 9/2004 | Chen | ................... | G06F 11/1417 714/15 |
| 2005/0177829 A1 * | 8/2005 | Vishwanath | .............. | G06F 8/61 717/177 |
| 2005/0283599 A1 * | 12/2005 | Zimmerman et al. | ............ | 713/2 |
| 2006/0041738 A1 * | 2/2006 | Lai | ...................... | G06F 11/1417 713/2 |

(Continued)

*Primary Examiner* — Loan L. T. Truong
(74) *Attorney, Agent, or Firm* — Christopher P. Maiorana, PC (57) ABSTRACT

An apparatus includes a non-volatile memory and a controller. The non-volatile memory includes a user area and a non-user area. The user area is generally enabled to store and retrieve data in a logical block address space of a host. The non-user area stores a failure-specific recovery routine. The controller may be communicatively coupled to the non-volatile memory. The controller is generally enabled, when operationally coupled to the host, (i) to respond to host commands to read and to write data into the user area of the non-volatile memory and (ii) upon detection of a predefined failure of a controller boot process, to respond to host read requests by returning the failure-specific recovery routine stored in the non-user area of the non-volatile memory.

20 Claims, 7 Drawing Sheets

(56) References Cited

U.S. PATENT DOCUMENTS

| | | | |
|---|---|---|---|
| 2006/0129795 A1* | 6/2006 | Bulusu et al. | 713/2 |
| 2006/0143431 A1* | 6/2006 | Rothman et al. | 713/2 |
| 2007/0174602 A1* | 7/2007 | Kao | 713/2 |
| 2007/0261045 A1* | 11/2007 | Gujarathi | G06F 8/65 717/168 |
| 2008/0091935 A1* | 4/2008 | Song | 713/2 |
| 2008/0301424 A1* | 12/2008 | Barajas | G06F 11/1417 713/2 |
| 2009/0217024 A1* | 8/2009 | Childs | G06F 11/1417 713/2 |
| 2010/0017589 A1* | 1/2010 | Reed et al. | 713/2 |
| 2010/0191944 A1 | 7/2010 | Numata et al. | 713/1 |
| 2010/0192130 A1* | 7/2010 | Hawblitzel | G06F 9/44589 717/126 |
| 2010/0217927 A1* | 8/2010 | Song | G06F 3/0616 711/103 |
| 2010/0241815 A1* | 9/2010 | McManis | 711/154 |
| 2010/0262818 A1* | 10/2010 | Lee | G06F 9/4401 713/2 |
| 2011/0016302 A1* | 1/2011 | Amou | G06F 11/1417 713/2 |
| 2011/0035543 A1* | 2/2011 | Yang | G06F 3/0613 711/103 |
| 2011/0302572 A1* | 12/2011 | Kuncoro et al. | 717/171 |
| 2012/0066546 A1* | 3/2012 | Kim | 714/15 |
| 2012/0191929 A1* | 7/2012 | Zietzke | G06F 9/45533 711/162 |
| 2012/0254602 A1* | 10/2012 | Bhansali | G06F 21/575 713/2 |
| 2012/0272033 A1 | 10/2012 | Murphy et al. | 711/171 |
| 2012/0278538 A1* | 11/2012 | Nango | G06F 12/0246 711/103 |
| 2012/0311279 A1 | 12/2012 | Hong et al. | 711/162 |
| 2012/0324183 A1* | 12/2012 | Chiruvolu | G06F 11/2038 711/162 |
| 2013/0024682 A1* | 1/2013 | Dolgunov et al. | 713/100 |
| 2013/0047031 A1* | 2/2013 | Tabone et al. | 714/15 |
| 2013/0111605 A1* | 5/2013 | Maeda et al. | 726/27 |
| 2013/0185789 A1* | 7/2013 | Hagiwara | G06F 21/45 726/18 |
| 2013/0290789 A1* | 10/2013 | Wen | 714/37 |
| 2013/0332771 A1* | 12/2013 | Salapura et al. | 714/15 |
| 2014/0172797 A1* | 6/2014 | Henning | G06F 9/441 707/636 |
| 2014/0245093 A1* | 8/2014 | Ma | G06F 11/00 714/747 |
| 2014/0281453 A1* | 9/2014 | Friedman | G06F 11/1417 713/2 |

\* cited by examiner

SOLID STATE DRIVE EMERGENCY PRE-BOOT APPLICATION PROVIDING EXPANDED DATA RECOVERY FUNCTION

This application relates to U.S. Provisional Application No. 61/882,869, filed Sep. 26, 2013 and U.S. Provisional Application No. 61/857,758, filed Jul. 24, 2013, each of which are hereby incorporated by reference in their entirety.

FIELD OF THE INVENTION

The invention relates to solid-state drive controllers generally and, more particularly, to a method and/or apparatus for implementing a solid state drive emergency pre-boot application providing an expanded data recovery function.

BACKGROUND

Solid-State storage controllers employ a Flash Translation Layer (FTL) to map a Logical Block Address (address location on the storage device presented to the host) to the physical location on the non-volatile memory (NVM) managed by the controller where the data resides. When an event occurs that causes some portion of the FTL to be lost or damaged, or the FTL becomes inconsistent due to a power failure, unsafe shutdown, or programming bug, the FTL is taken through a recovery process to restore the FTL back to a consistent state. The recovery process is bounded by space, time and resources available to firmware running on the controller. In the event that some portion of the FTL cannot be recovered due to some combination of data loss and/or any one of the aforementioned parameters being exceeded, time being related to the expectation of the user or host system accessing the storage controller, the controller, the host system or the user may declare the storage device inoperable.

It would be desirable to have a solid state drive emergency pre-boot application providing an expanded data recovery function for the storage controller.

SUMMARY

The invention concerns an apparatus including a non-volatile memory and a controller. The non-volatile memory includes a user area and a non-user area. The user area is generally enabled to store and retrieve data in a logical block address space of a host. The non-user area stores a failure-specific recovery routine. The controller may be communicatively coupled to the non-volatile memory. The controller is generally enabled, when operationally coupled to the host, (i) to respond to host commands to read and to write data into the user area of the non-volatile memory and (ii) upon detection of a predefined failure of a controller boot process, to respond to host read requests by returning the failure-specific recovery routine stored in the non-user area of the non-volatile memory.

BRIEF DESCRIPTION OF THE FIGURES

Embodiments of the invention will be apparent from the following detailed description and the appended claims and drawings in which:

DETAILED DESCRIPTION OF EMBODIMENTS

Embodiments of the invention include providing a solid state drive/disk (SSD) emergency pre-boot application (EPBA) that may (i) provide an expanded system and/or data recovery function, (ii) be stored in a non-user (e.g., root) area instead of in a user area associated with a logical block address (LBA) space of a host, (iii) be used for drive diagnostics, (iv) be used to initiate a self recovery procedure, (v) be used to provide instructions to a user, and/or (vi) allow recovery of user data and transmission of the user data to the host for storage in a different storage device.

Embodiments of the invention may be implemented in numerous ways, including as a process, an article of manufacture, an apparatus, a system, a composition of matter, and a computer readable medium such as a computer readable storage medium (e.g. media in an optical and/or magnetic mass storage device such as a disk, or an integrated circuit having non-volatile storage such as flash storage) and/or a computer network where program instructions are sent over optical or electronic communication links.

In some embodiments, a method and/or apparatus is provided for recovering a flash translation layer (FTL) on a solid-state storage device (SSD). The method includes receiving a read command from the host to read a master boot record (MBR), determining the FTL requires recovery, responding to the host read command by returning a master boot record containing a bootstrap program that will load an emergency pre-boot application from the storage device, the host transferring execution control to the bootstrap program, the bootstrap program sending a series of one or more commands from the host to the solid-state storage device to load the emergency pre-boot application.

Figure 1:
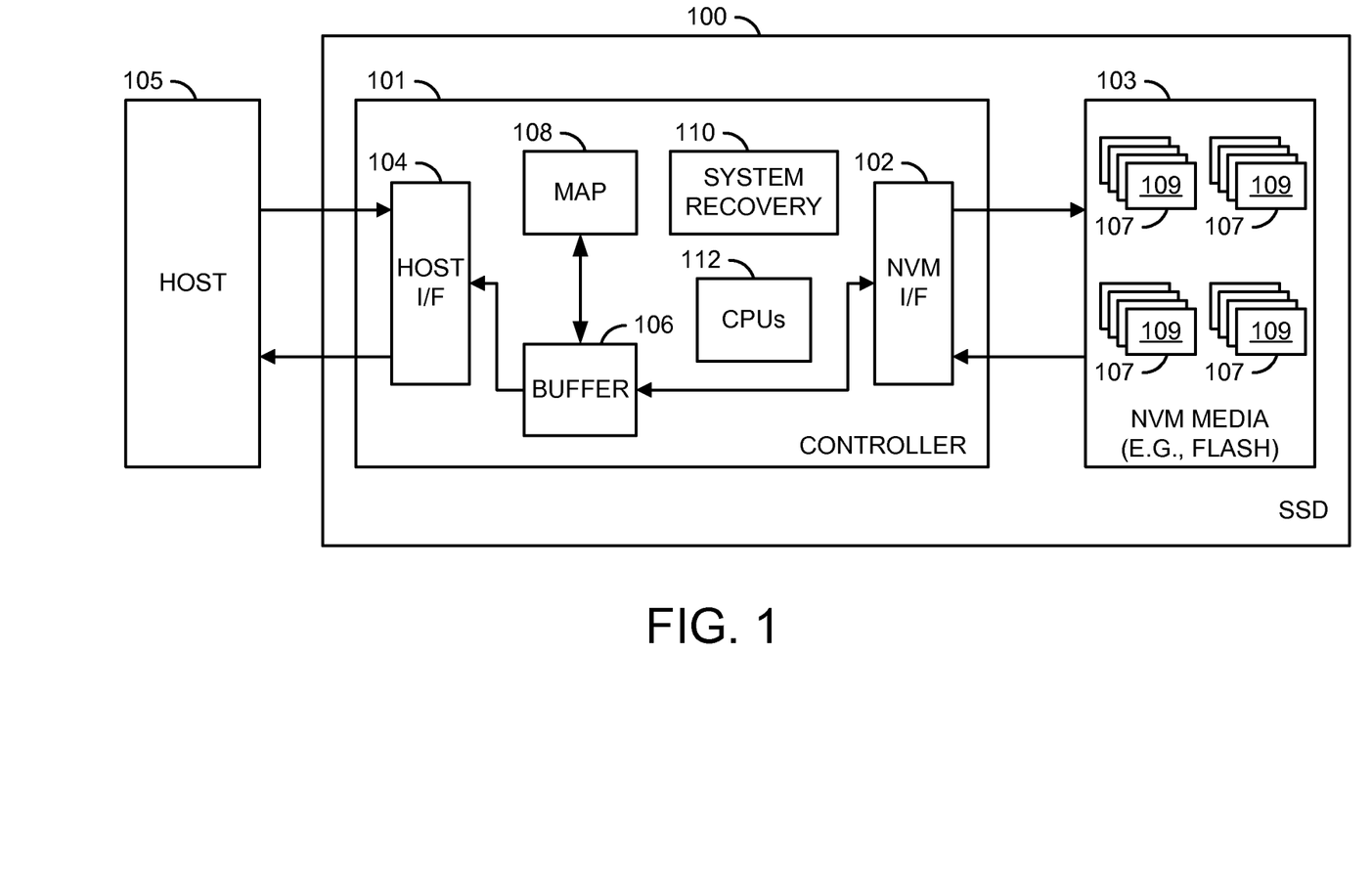
FIG. 1 is a diagram illustrating a solid state drive/disk (SSD)/non-volatile memory (NVM) system in accordance with an embodiment of the invention.

Referring to FIG. 1, a diagram is shown illustrating a solid state drive/disk (SSD)/non-volatile memory (NVM) system 100 in accordance with an embodiment of the invention. In various embodiments, the SSD/NVM system 100 comprises a block 101 and a block 103. The block 101 comprises a controller implementing an expanded data recovery function in accordance with an embodiment of the invention. The block 103 comprises a non-volatile memory (NVM) media having a user data storage area and a non-user data storage area. The non-user data storage area stores one or more emergency pre-boot application (EPBA) images in accordance with an embodiment of the invention. In various embodiments, the system 100 can be communicatively coupled to a host 105. When communicatively coupled to a host 105, the system 100 may appear as one or more storage devices. Through the EPBA, the system 100 may use computing resources of the host 105 to perform diagnostic and/or data recovery functions, and may provide enhanced communications with a user regarding system failures and/or failure recovery options.

The controller 101 may be configured to control one or more individual non-volatile memory lanes. In some embodiments, the controller 101 may implement multiple memory lane controller instances to control a plurality of non-volatile memory lanes. The controller 101 has a non-volatile memory interface 102 configured to couple the controller 101 to the non-volatile memory media 103. The non-volatile memory media 103 may comprises one or more non-volatile memory devices 107. The non-volatile memory devices 107 have, in some embodiments, one or more non-volatile memory die 109. According to a type of a particular one of the non-volatile memory devices 107, a plurality of non-volatile memory die 109 in the particular non-volatile memory device 107 are optionally and/or selectively accessible in parallel. The non-volatile memory devices 107 are generally representative of one type of storage device enabled to communicatively couple to controller 101. However, in various embodiments, any type of storage device is usable, such as SLC (single level cell) NAND flash memory, MLC (multi-level cell) NAND flash memory, TLC (triple level cell) NAND flash memory, NOR flash memory, read-only memory (ROM), static random access memory (SRAM), dynamic random access memory (DRAM), magneto-resistive random-access memory (MRAM), ferromagnetic memory (e.g., FeRAM, F-RAM FRAM, etc.), phase-change memory (e.g., PRAM, PCRAM, etc.), racetrack memory (or domain-wall memory (DWM)), resistive random-access memory (RRAM or ReRAM), or any other type of memory device or storage medium.

In some embodiments, the controller 101 and the non-volatile memory media 103 are implemented on separate integrated circuits. When the controller 101 and the non-volatile memory media 103 are implemented as separate integrated circuits (or devices), the non-volatile memory interface of the controller 101 is generally enabled to manage a plurality of data input/output (I/O) pins and a plurality of control I/O pins. The data I/O pins and the control I/O pins may be configured to connect the device containing the controller 101 to the external device(s) forming the non-volatile memory media 103. In various embodiments, the controller 101 is implemented as an embedded controller. In various embodiments, the controller 101 and the NVM media 103 implement a solid-state drive/disk (SSD).

The controller 101 also has a command (or host) interface 104 configured to receive commands and send responses to the host 105. In embodiments implementing a plurality of non-volatile memory lanes, the controller 101 also includes multiplexing circuitry coupling the multiple instances of memory lane controllers to one or more embedded processors providing scheduling and/or data management of the plurality of non-volatile memory devices 107. In some embodiments, the controller 101 comprises data buffering and direct memory access (DMA) engines to store data or other information and to move the data or other information between the host 105 and the NVM media 103 using one or more memory lane controllers within the controller 101.

When a non-volatile memory read operation is performed (e.g., in response to a request originating either externally from the host 105 or internally from the controller 101) raw data is retrieved from the NVM media 103. To ensure the data returned is correct, the controller 101 may correct the raw data read from the NVM media 103 to a buffer 106 using an error correcting code (ECC). Various ECC codes can be used, such as BCH (Bose Chaudhuri Hocquenghem) codes, LDPC (low-density parity-check) code, turbo codes, polar codes, and convolutional codes. The ECC may operate on the granularity of a codeword (of fixed or variable size), referred to as an e-page.

Under normal conditions, the controller 101 can correct errors in the raw e-page using on-the-fly (or dynamic) decoding and return the corrected e-page (and/or other requested data, such as statistics) immediately (e.g., via the buffer 108). In such cases, the read operation for the particular e-page is considered complete. The controller 101 can perform various retry tasks when on-the-fly read decoding fails. Examples of the retry tasks are: additional reads with the same or different reference voltage (Vref), ECC re-decoding of different decoder inputs and/or parameters, digital signal processing techniques, higher-level redundancy functions using a redundancy code such as a RAID-like code, etc. In addition to the retry tasks, the controller 101 can perform a variety of background tasks to determine the cause of a read failure.

A flash translation layer (FTL) or map 108 is implemented in the controller 101 to manage data in the non-volatile (e.g., flash) memory media 103. At power up and reset the map 108 needs to be restored (e.g., from mapping data stored in the user area of the NVM media 103) in order for the controller 101 to associate physical locations of entries in the NVM media 103 with a logical block address space of the host 105. If a failure occurs in restoring the map 108, the controller 101 may perform a number of system recovery procedures 110. Operations of the controller 101 are generally implemented using one or more processors 112. However, the resources of the system 100 are generally limited in comparison with the resources available in the host 105. The system recovery procedures 110 generally comprise self-recovery routines that utilize the resources of the system 100 and failure-specific recovery routines (e.g., the EPBA images) that can leverage the computing power and resources of the host 105 in recovering from failure conditions of the system 100.

Figure 2:
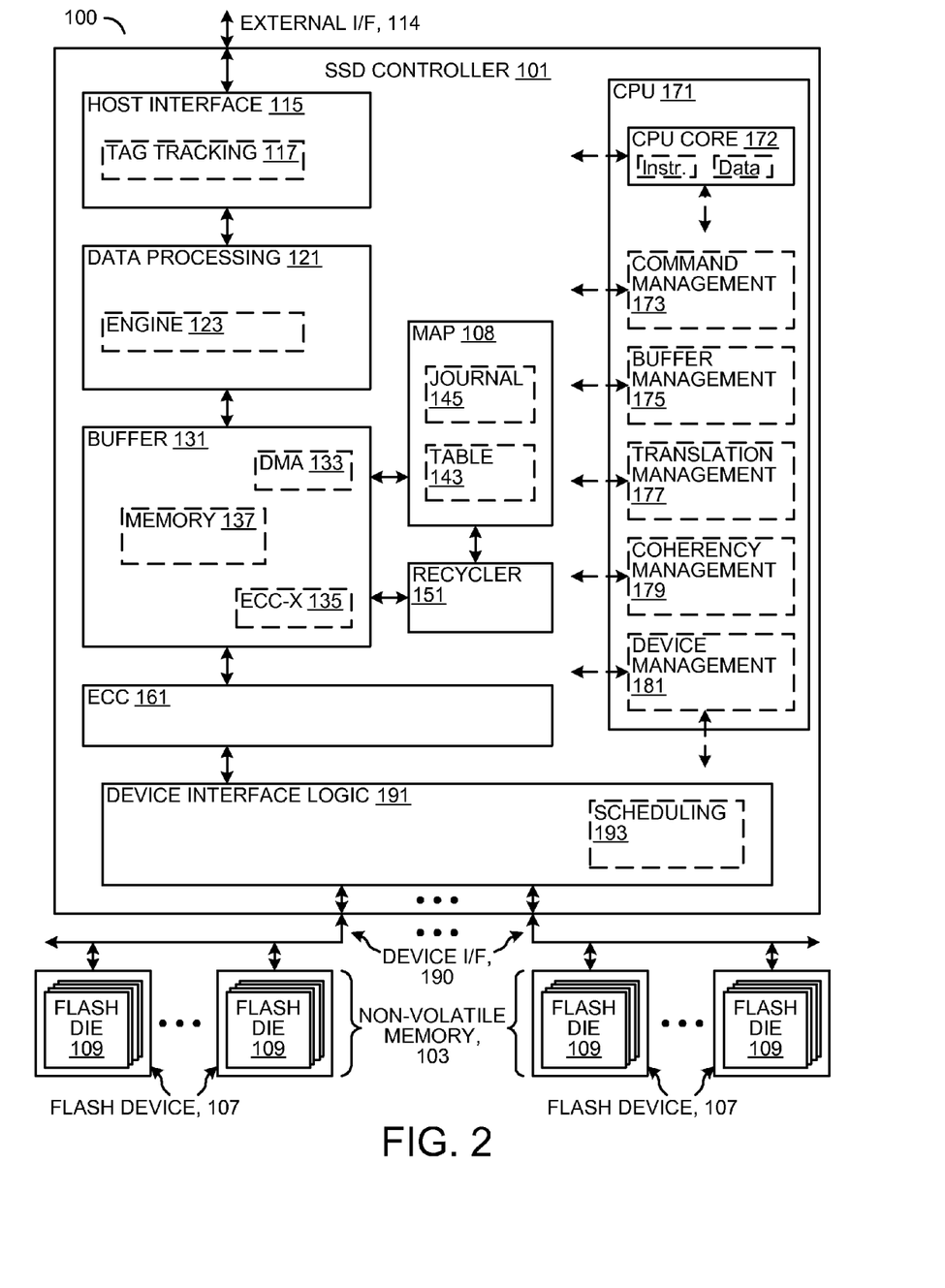
FIG. 2 is a diagram illustrating an embodiment of a SSD/NVM system including a controller implementing a system recovery function in accordance with embodiments of the invention.

Referring to FIG. 2, a diagram is shown illustrating an embodiment of a SSD/NVM controller implementing a data recovery function in accordance with embodiments of the invention. The controller 101 may be coupled to the host 105 via one or more external interfaces 114. According to various embodiments, the external interfaces (or protocols) 114 may include, but are not limited to, one or more of: a serial advanced technology attachment (SATA) interface; a serial attached small computer system interface (serial SCSI or SAS interface); a (peripheral component interconnect express (PCIe) interface; a Fibre Channel interface; an Ethernet Interface (such as 10 Gigabit Ethernet); a non-standard version of any of the preceding interfaces; a custom interface; or any other type of interface used to interconnect storage and/or communications and/or computing devices. For example, in some embodiments, the controller 101 includes a SATA interface and a PCIe interface.

The controller 101 is further coupled to the NVM media 103 via one or more device interfaces 190. According to various embodiments, the device interfaces (or protocols) 190 may include, but are not limited to, one or more of: an asynchronous interface; a synchronous interface; a double data rate (DDR) synchronous interface; an ONFI (open NAND flash interface) compatible interface, such as an ONFI 2.2 compatible interface; a Toggle-mode compatible non-volatile memory interface; a non-standard version of any of the preceding interfaces; a custom interface; or any other type of interface used to connect to storage devices.

According to various embodiments, the device interfaces 190 are organized as: one or more busses with one or more non-volatile memory devices 107 per bus; one or more groups of busses with one or more non-volatile memory devices 107 per bus, where busses in a group are generally accessed in parallel; or any other organization of non-volatile memory devices 107 coupled to device interfaces 190.

In general, the number of device interfaces 190 implemented may be varied between embodiments. In various embodiments, the device interfaces 190 are implemented as flash channels (or flash lanes), each of which has one or more flash devices 107, each of which has one or more flash die 109. For example, in some embodiments, each flash device 107 is configured as a single package with 2 channels and with 2N flash die 109, having N die on one channel, and N die on another channel. The package supports more than one channel to have more bandwidth. In various embodiments, board-level constraints may dictate a particular configuration, though factors like delivered bandwidth and capacity may come into play, too. For example, a non-volatile memory device 107 having four channels in one package (e.g., that might have four or 8 die—either 1 or 2 per channel) may be implemented in order to increase bandwidth (e.g., more channels) without increasing board real estate (e.g., occupying less area than 2 packages, each of which has only 2 channels). The device interface 190 may also be configured to couple read only memory (ROM) devices (not shown) providing portions of a non-user data area storing data recovery routines in accordance with embodiments of the invention.

The controller 101 may have one or more modules, such as a host interface module 115, a data processing module 121, a buffer 131, the map 108, a recycler 151, an error-correcting code (ECC) module 161, a central processing unit (CPU) 171, and device interface logic 191. The specific modules and interconnections illustrated in FIG. 2 are merely representative of one embodiment, and many arrangements and interconnections of some or all of the modules, as well as additional modules not illustrated, may be implemented to meet the design criteria of a particular implementation. In a first example, in some embodiments, there are two or more host interfaces 115 to provide dual-porting. In a second example, in some embodiments, the data processing module 121 and/or the ECC module 161 are combined with the buffer 131. In a third example, in some embodiments, the host interfaces 115 are directly coupled to the buffer 131, and the data processing module 121 optionally and/or selectively operates on data stored in the buffer 131. In a fourth example, in some embodiments, the device interface logic 191 is directly coupled to the buffer 131, and the ECC module 161 optionally and/or selectively operates on data stored in the buffer 131.

The host interface 115 sends and receives commands and/or data via the external interface 114, and, in some embodiments, tracks progress of individual commands via a tag tracking module 117. For example, the commands include a read command specifying an address (such as an LBA) and an amount of data (such as a number of LBA quanta, e.g., sectors) to read; in response the controller 101 provides read status and/or read data. For another example, the commands include a write command specifying an address (such as an LBA) and an amount of data (such as a number of LBA quanta, e.g., sectors) to write; in response, the controller 101 provides write status and/or requests write data and optionally subsequently provides write status. In some embodiments, the host interface 115 is compatible with a SATA protocol and, using NCQ commands, is enabled to have up to 32 pending commands, each with a unique tag represented as a number from 0 to 31. In some embodiments, the tag tracking module 117 is enabled to associate an external tag for a command received via the external interface 114 with an internal tag used to track the command during processing by the controller 101.

According to various embodiments, one or more of: data processing module 121 optionally and/or selectively processes some or all data sent between the buffer 131 and the external interfaces 114; and data processing module 121 optionally and/or selectively processes data stored in the buffer 131. In some embodiments, the data processing module 121 uses one or more engines 123 to perform one or more of: encrypting; decrypting; compressing; decompressing; formatting; reformatting; transcoding; and/or any other data processing and/or manipulation task.

The buffer 131 stores data sent to/from the external interfaces 114 from/to the device interfaces 190. In some embodiments, the buffer 131 additionally stores system data, such as some or all map tables and/or journal entries, used by the controller 101 to manage the non-volatile memory devices 107. In various embodiments, the buffer 131 has one or more of: a memory 137 used for temporary storage of data; a direct memory access (DMA) modules 133 used to control movement of data to and/or from the buffer 131; an ECC-X module 135 used to provide a higher-level error correction function; and other data movement and/or manipulation functions. An example of a higher-level error correction function is a RAID-like capability, where redundancy is at a non-volatile memory device (e.g., multiple ones of the non-volatile memory devices 107) level and/or a non-volatile memory die (e.g., non-volatile memory die 109) level instead of at a disk level.

According to various embodiments, one or more of: the ECC module 161 optionally and/or selectively processes some or all data sent between the buffer 131 and the device interfaces 190; and the ECC module 161 optionally and/or selectively processes data stored in the buffer 131. In some embodiments, the ECC module 161 implements one or more of: a cyclic redundancy check (CRC) code; a Hamming code; an Reed-Solomon (RS) code; a Bose Chaudhuri Hocquenghem (BCH) code; an low-density parity check (LDPC) code; a Viterbi code; a trellis code; a hard-decision code; a soft-decision code; an erasure-based code; any error detecting and/or correcting code; and any combination of the preceding.

The device interface logic 191 controls the non-volatile memory devices 107 via the device interfaces 190. The device interface logic 191 is enabled to send data to/from the non-volatile memory devices 107 according to a protocol of the non-volatile memory devices 107. The device interface logic 191 includes a scheduling module 193 to selectively sequence control of the non-volatile memory devices 107 via the device interfaces 190. For example, in some embodiments, the scheduling module 193 is enabled to queue operations to the non-volatile memory devices 107, and to selectively send the operations to individual ones of the non-volatile memory devices 107 (or the non-volatile memory die 109) as the individual non-volatile memory devices 107 (or the non-volatile memory die 109) are available.

The map 108 converts between data addressing used on the external interfaces 114 and data addressing used on the device interfaces 190, using table 143 to map external data addresses to locations in the non-volatile memory 103. For example, in some embodiments, the map 108 converts logical block addresses (LBAs) used on the external interfaces 114 to block and/or page addresses targeting one or more non-volatile memory die 109, via mapping provided by table 143. In some embodiments, a granularity of map 108 is fixed, such as mapping first fixed-sized logical blocks used on the external interfaces 114 to second fixed-sized blocks used on the device interfaces 190. In other embodiments, a granularity of map 108 is variable and not all blocks used on either the external interfaces 114 or the device interfaces 190 are necessarily a same size.

In some embodiments, table 143 associates logical page addresses with a respective map entry, where the logical page addresses are a portion of and/or are derived from the LBA, and the map entry identifies a portion of the non-volatile memory. For example, in some embodiments, the logical page address is a higher-order portion of the LBA, and a lower-order portion of the LBA is an offset within a logical page specified by the logical page address.

In some embodiments, the map entry identifies the portion of the non-volatile memory as a base address, such as a read unit address, and a length, such as a number of read units. In some embodiments, the read units are sequential in locations in an address space of the non-volatile memory. In further embodiments, the read units are striped across a plurality of non-volatile memory die (such as non-volatile memory die 109) and/or non-volatile memory devices (such as non-volatile memory devices 107).

In some embodiments, the map 108 uses a table 143 to perform and/or to look up translations between addresses used on the external interfaces 114 and data addressing used on the device interfaces 190. According to various embodiments, the table 143 is one or more of: a two-level map; a multi-level map; a map cache; a compressed map; any type of mapping from one address space to another; and any combination of the foregoing.

In some embodiments, the map 108 also stores a volatile (not yet saved to NVM) portion of a journal 145, and is further enabled to use some or all of the journal 145 to update the table 143 at power-on. In various embodiments, when the table 143 is updated, such as due to a write operation to a particular logical block address updating an entry in the table 143 corresponding to the particular logical block address with a new physical address in NVM corresponding to a location of data of the write operation, an entry comprising the particular logical block address and the new physical address is added to the journal 145. When the journal 145 reaches a determined size, or based on other events such as receiving a standby-immediate command, at least a portion of the journal 145 is saved to the user area of the NVM media 103. After the at least a portion of the journal 145 is saved to NVM, the at least a portion of the journal 145 is available to accumulate further entries. The term "determined" is generally used to indicate that an associated value and/or parameter is set by a user (e.g., using an input or through configuration information) or dynamically based on one or more operational criteria and/or measurements.

According to various embodiments, the table 143 and/or the journal 145 include one or more of: static random access memory (SRAM); dynamic random access memory (DRAM); non-volatile memory (such as flash memory); cache memory; on-chip memory; off-chip memory; and any combination of the foregoing. In some embodiments, the buffer 131 contains some or all of the table 143 and/or the journal 145. For example, buffer 131 contains a cache of a portion of the table 143, and/or a recently-written portion of the journal 145.

In some embodiments, the recycler module 151 performs garbage collection. For example, in some embodiments, non-volatile memory devices 107 contain blocks that need to be erased before the blocks are re-writeable. The recycler module 151 is enabled to determine which portions of the non-volatile memory devices 107 are actively in use, such as by scanning a map maintained by map 108, and to make unused portions of non-volatile memory devices 107 available for writing by erasing them. In further embodiments, the recycler module 151 is enabled to move data stored within the non-volatile memory devices 107 to make larger contiguous portions of the non-volatile memory devices 107 available for writing.

The CPU 171 controls various portions of controller 101. The CPU 171 includes a CPU core 172. The CPU core 172 is, according to various embodiments, one or more single-core or multi-core processors. The individual processor cores in the CPU core 172 are, in some embodiments, multi-threaded. The CPU core 172 includes instruction and/or data caches and/or memories. For example, the instruction memory contains instructions to enable the CPU core 172 to execute software (sometimes called firmware) to control the controller 101. In some embodiments, some or all of the firmware executed by the CPU core 172 is stored on the non-volatile memory devices 107.

In various embodiments, the CPU 171 further includes: a command management module 173 to track and control commands received via the external interfaces 114 while the commands are in progress; a buffer management module 175 to control allocation and use of the buffer 131; a translation management module 177 to control the map 108, such as managing the table 143 and/or the journal 145; a coherency management module 179 to control consistency of data addressing and to avoid conflicts such as between external data accesses and recycle data accesses; a device management module 181 to control device interface logic 191; and optionally other management units.

In one example, the device management module 181 may be configured to implement a flash translation layer (FTL). The translation management module 177 and/or the device management module 181 may be configured to manage execution of an emergency pre-boot application routine on the host 105 when, for example, a failure occurs in restoring the FTL at boot or following a reset. None, any, or all of the management functions performed by the CPU 171 are, according to various embodiments, controlled and/or managed by hardware, by firmware, by software (such as software executing on the CPU core 172 or on a host connected via the external interfaces 110), or any combination thereof. The device management module 181 may be implemented as part of the CPU 171, or could be implemented in hardware, or could be implemented by a combination of firmware running on the CPU 171 and hardware.

In some embodiments, the CPU 171 is enabled to perform other management tasks, such as one or more of: gathering and/or reporting performance statistics; implementing self-monitoring analysis and reporting technology (SMART); controlling power sequencing, controlling and/or monitoring and/or adjusting power consumption; responding to power failures; controlling and/or monitoring and/or adjusting clock rates; and other management tasks.

Various embodiments include a computing-host non-volatile memory controller that is similar to the controller 101 and is compatible with operation with various computing hosts, such as via adaptation of the host interface 115 and/or the external interface 114. The various computing hosts include one or any combination of a computer, a workstation computer, a server computer, a storage server, a personal computer (PC), a laptop computer, a notebook computer, a netbook computer, a personal digital assistant (PDA), a media player, a media recorder, a digital camera, a cellular handset, a cordless telephone handset, and an electronic game.

In various embodiments, all or any portion of the controller 101 (or a computing-host non-volatile memory controller) are implemented on a single integrated circuit (IC), a single die of a multi-die IC, a plurality of dice of a multi-die IC, or a plurality of ICs. For example, the buffer 131 is implemented on a same die as other elements of the controller 101. For another example, the buffer 131 is implemented on a different die than other elements of controller 101.

Figure 3:
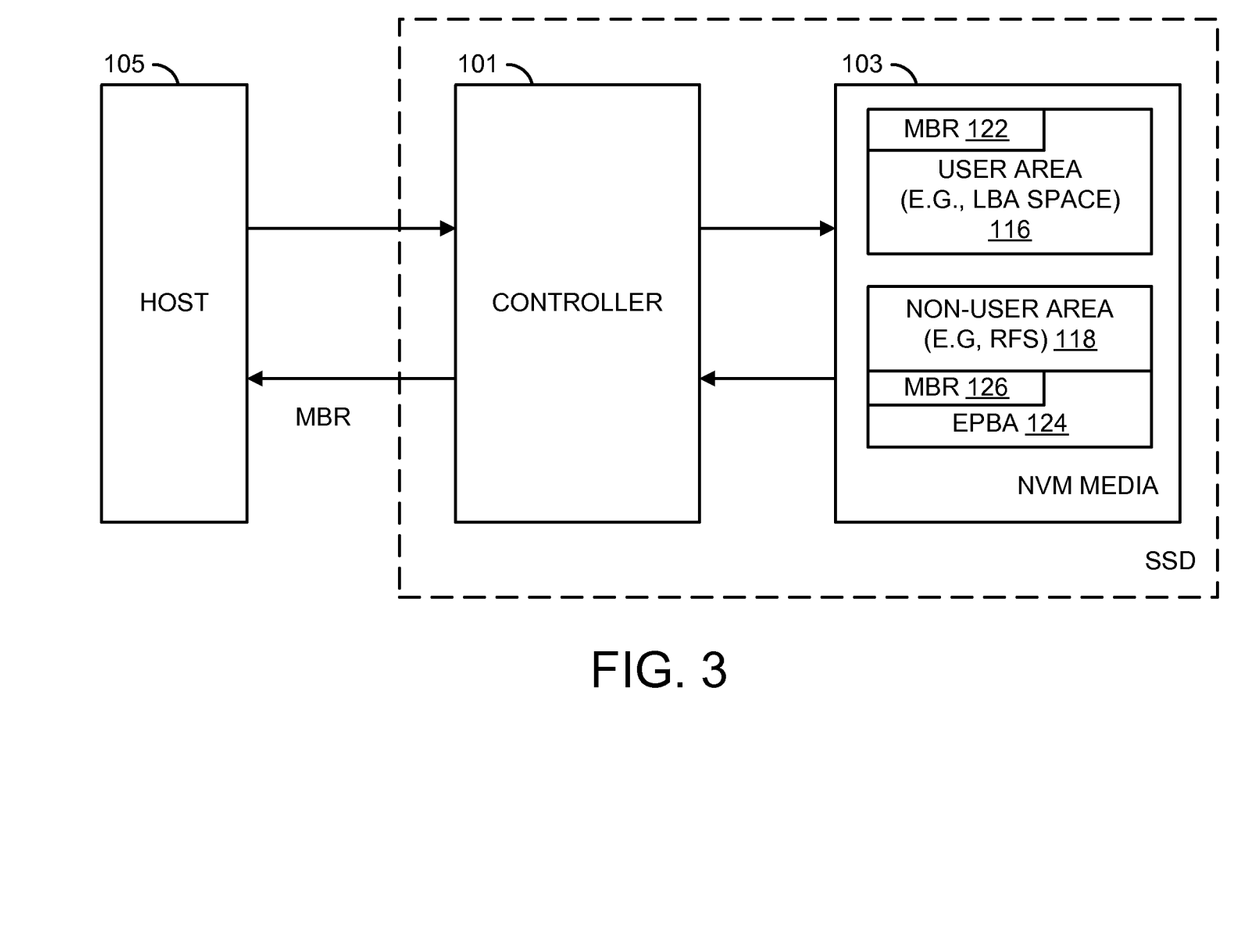
FIG. 3 is a diagram illustrating user and non-user areas of a SSD/NVM system in accordance with an embodiment of the invention.

Referring to FIG. 3, a diagram is shown illustrating user and non-user areas of a SSD/NVM system in accordance with an embodiment of the invention. In various embodiments, the NVM media 103 is divided (e.g., partitioned) into a user area 116 and a non-user area 118. The user area 116 is enabled to store and retrieve data in a logical block address space of the host 105. For example, a flash translation layer may be employed to map host logical block addresses to physical locations where the data is stored in the NVM media 103. The user area 116 is enabled to store mapping data for maintaining and restoring the FTL map 108. In some embodiments, a portion of the user area 116 may be partitioned off, dedicated, reserved, etc. for the FTL. The user area 116 also stores a master boot record (MBR) 122 that is used to establish communications between the SSD 100 and the host 105 (e.g., boot or load the SSD 100 as a storage device on the host 105).

The non-user area 118 generally comprises various embodiments of a primitive, highly reliable persistent storage enabled to store important system information such as firmware image(s) of the SSD 100. In various embodiments, the non-user area 118 is further enabled to store an emergency pre-boot application (EPBA) 124. The EPBA 124 generally implements one or more failure-specific data recovery routines. The EPBA 124 generally allows the SSD 100 to leverage the computing power of the host 105 to provide expanded and/or enhanced system recovery capabilities.

When the SSD 100 is operating according to a normal operating condition (e.g., power up or reset successful and user area 116 accessible), the MBR 122 is returned in response to an initial read request from the host 105. When the controller 101 detects a failure of the SSD 100 to obtain the normal operating condition (e.g., portions of the mapping information or meta-data that maintains the translation become damaged, etc.), the controller 101 may first attempt a self-recovery. Upon a failure to recover, the controller 101 returns an alternate MBR 126 (or bootstrap loader routine) that causes the host 105 to load and execute the EPBA 124.

In general, a drive is only capable of exposing storage to the host 105 via a standard interface. To allow the host 105 to boot from a storage device, formatting standards have been developed to allow a basic input output system (BIOS) of the host 105 to find and load a bootstrap image from the storage device. The EPBA 124 may present a virtual view of the SSD 100 in order to ensure communication with the host 105 is established. The virtual view may provide an image (e.g., partition table) of a similar or smaller drive. In some embodiments, the EPBA. 124 contains a bootstrap routine that uses the basic input/output system (BIOS) level services of the host 105 to load and execute recovery code, allowing the host 105 to perform the recovery process.

The virtual image stored in the non-user area 118 may mirror the structure of the user area 116 with an exception that the virtual image of the user area 116 appears sparsely populated. The virtual image allows communication with the SSD 100 to be established rather than a user receiving a message like "drive not found." The EPBA 124 generally allows a host user to be informed that a problem has occurred and to receive instructions on what steps can and/or should be taken, including possibly recovering the drive through an interactive process involving the host 105 and host user. In some embodiments, the interactive process may even include attempting to recover the structure of the data stored in the user area 116 through a brute force technique using self-journaling data written with user data in the user area 116.

In various embodiments, the EPBA 124 may make the SSD 100 partially functional in most cases. The host user at least may be informed that SSD 100 has been corrupted, and will be able to do some diagnostics or even start a so-called self recovery (SR) procedure, such as described in a co-pending U.S. patent application Ser. No. 13/796,264, filed Mar. 12, 2013, entitled SELF RECOVERY INA SOLID-STATE DRIVE, which is incorporated by reference along with any application(s) cited therein in their entirety. The particular EPBA functionality implemented depends on the SSD vendor.

In various embodiments, the SSD 100 implements a multi-level map structure comprising a leaf level and one or more higher levels. Each level comprises a plurality of pages, each of which comprises a plurality of entries. A logical address, such as a logical block address (LBA) of an input/output (I/O) device, is looked up in the multi-level map structure to determine a corresponding one of the entries in a particular one of the leaf-level map pages. The corresponding entry of the LBA comprises information associated with the LBA, such as a physical location in the non-volatile memory (NVM) of the I/O device of data associated with the LBA. In some implementations, the corresponding entry further comprises an indication as to whether the corresponding entry is valid or invalid, and optionally whether the LBA has been trimmed or has not been written at all. For example, an invalid entry is able to encode information, such as whether the associated LBA is trimmed, in the physical location portion of the invalid entry.

In most embodiments the map structures are too big, change too fast, and need too frequent access to be saved in the non-user area 118. Instead, the map structures of the map 108 may be stored in a portion of the user area 116, or separate FTL area may be implemented in the NVM media 103. The location of the map information itself is regularly checkpointed. Upon boot a quite complicated recovery procedure is performed to recover the so-called "metadata" before the SSD 100 can become operational (e.g., can find any previously written LBA and accept new writes).

In various embodiments, a SSD boot procedure can be divided into several distinct steps: ROM Boot, full hardware (HW) initialization, map recovery, ensure that there are enough reserved blocks to run normal operations, and communicate the operational status to the host. The ROM boot is normally done by firmware, located in SSD read only memory (ROM). In one example, the ROM boot step may comprise (i) initializing part of the SSD HW necessary for a next step (e.g., ability to perform NVM read operations will be needed at least), (ii) find a root directory record of a root file system in the non-user area 118 and determine all the locations of the root file records, (iii) load the firmware image and start executing the firmware. The step of communicating the operational status to the host 105 and the previous steps starting from full HW initialization are done by the firmware loaded in the first step. After the full HW initialization, the controller 101 is fully functional from a hardware perspective including having the ability to communicate with the host 105. However, the SSD 100 cannot become fully operational until the step of ensuring enough reserved blocks is completed because the SSD 100 does not know the location of already written LBA entries and does not have enough reserved blocks until then.

In various embodiments, if any of the boot steps fail, the SSD 100 may be rendered non-readable, a condition typically referred to as "bricked". However, in most embodiments, a probability of the first or second step failing is extremely low.

Field experience shows that a vast majority of "bricked" drives failed in the map recovery step or in the fourth step (e.g., an Out Of Space—OOS—situation). In some instances, map recovery failure can be due to media corruption or some firmware bug. In other instances, the SSD can get into an Out Of Space situation which will also prevent the SSD from becoming operational.

In various embodiments, the SSD 100 is also the boot device of the host 105. That is, after the SSD 100 becomes operational, the host 105 reads the master boot record (MBR) 122 from some predefined LBA (e.g., normally, LBA 0). The MBR 122 is treated as a binary code—that is, loaded into random access memory (RAM) of the host 105 and executed. In some embodiments, a so-called pre boot application (PBA) is implemented ("boot" here refers to a host boot, not the SSD boot). The PBA is also called a "Shadow MBR" which will be delivered to the host on an attempt to read LBA 0 if LBA 0 cannot be read (e.g., corrupted or user credentials need to be verified before reading can be allowed). Such a PBA resides in a special LBA range and allows a user to perform a variety of actions—failure analysis, self-authentication, etc. However such an approach does not work if the map recovery step could not complete, because in such a case, the SSD will not be able to assume the definite location of any of the LBAs in the drive is known (LBA 0 included).

In various embodiments, a special emergency PBA (EPBA) is placed into the non-user area 118 (e.g., in an RFR of a Root File System) during drive manufacturing. In the case of a map recovery failure or an Out Of Space situation, the EPBA may enable the SSD 100 to become operational instead of bricked. The manner in which the EPBA is communicated to the host depends on the Host Interface protocol. For example, host read requests will be served from the special EPBA and the contents of the EPBA treated by the host as the MBR to be loaded in RAM and executed.

In some embodiments, the user is provided with a short message, for example, describing a problem and suggesting a course of action (e.g., sending the drive for data recovery to the vendor or another designated body). In various embodiments, the user can have an option to start a Self Recovery (SR) procedure (an example of which can be found in co-pending U.S. patent application Ser. No. 13/796,264, filed Mar. 12, 2013, entitled SELF RECOVERY IN A SOLID-STATE DRIVE, which is incorporated by reference along with any application(s) cited therein in their entirety) and after that an SR running status may be communicated to the user. In further embodiments, the user can be warned that the drive is running out of space and recommend rebooting the host 105 (which will cause the drive to reboot as well) and moving the data elsewhere to avoid data loss.

Figure 4:
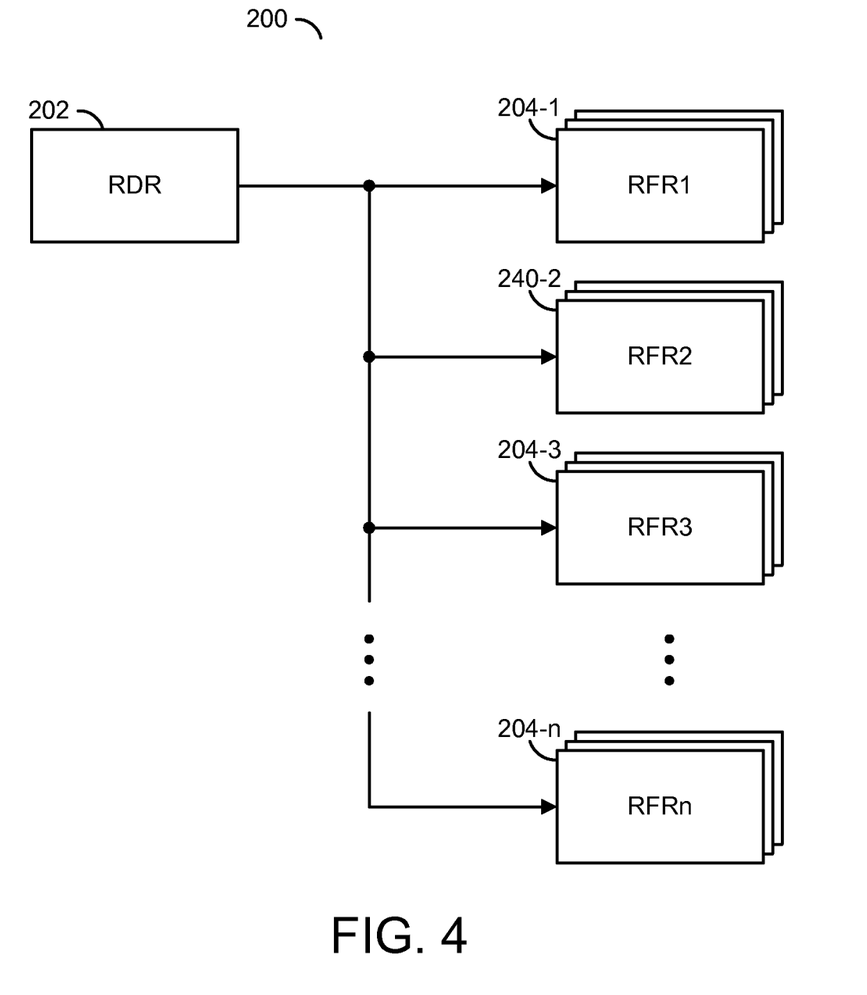
FIG. 4 is a diagram illustrating a root file system.

Referring to FIG. 4, a diagram is shown illustrating a root file system (RFS) 200 in accordance with an embodiment of the invention. In some embodiments, the non-user area 118 is implemented as a so-called "root file system" (RFS) or simply "root" 200. The root 200 contains files with important system information and SSD firmware image(s). According to various embodiments, the RFS 200 comprises several internal records (or files), including a root directory record (RDR) 202 and multiple root file records (RFRs) 204-1, . . . , 204-*n*. The RDR 202 contains physical locations of the RFRs 204-1 through 204-*n* and, therefore, changes (and needs to be rewritten) each time any of the RFRs 204-1 through 204-*n* moves. In general, the RFRs 204-1 through 204-*n* are modified very infrequently (e.g., when firmware image is being updated), so there are not many copies of the RDR 202 during the lifetime of the SSD 100. Because the RDR 202 is seldom copied, location of the RDR 202 may be confined to a small number of physical blocks such as, but not limited to, Block 0 and Block 1 of a certain NVM die 109 or a ROM die. During boot, the SSD 100 is able to scan the few blocks and find the latest RDR 202 (and therefore the latest location of each RFR).

In some embodiments, the root 200 contains several copies of each of the RFRs 204-1, . . . , 204-*n* to increase reliability. In general, the root 200 provides a very reliable albeit rather slow type of storage that is suitable for system information and firmware images that do not change often.

Figure 5:
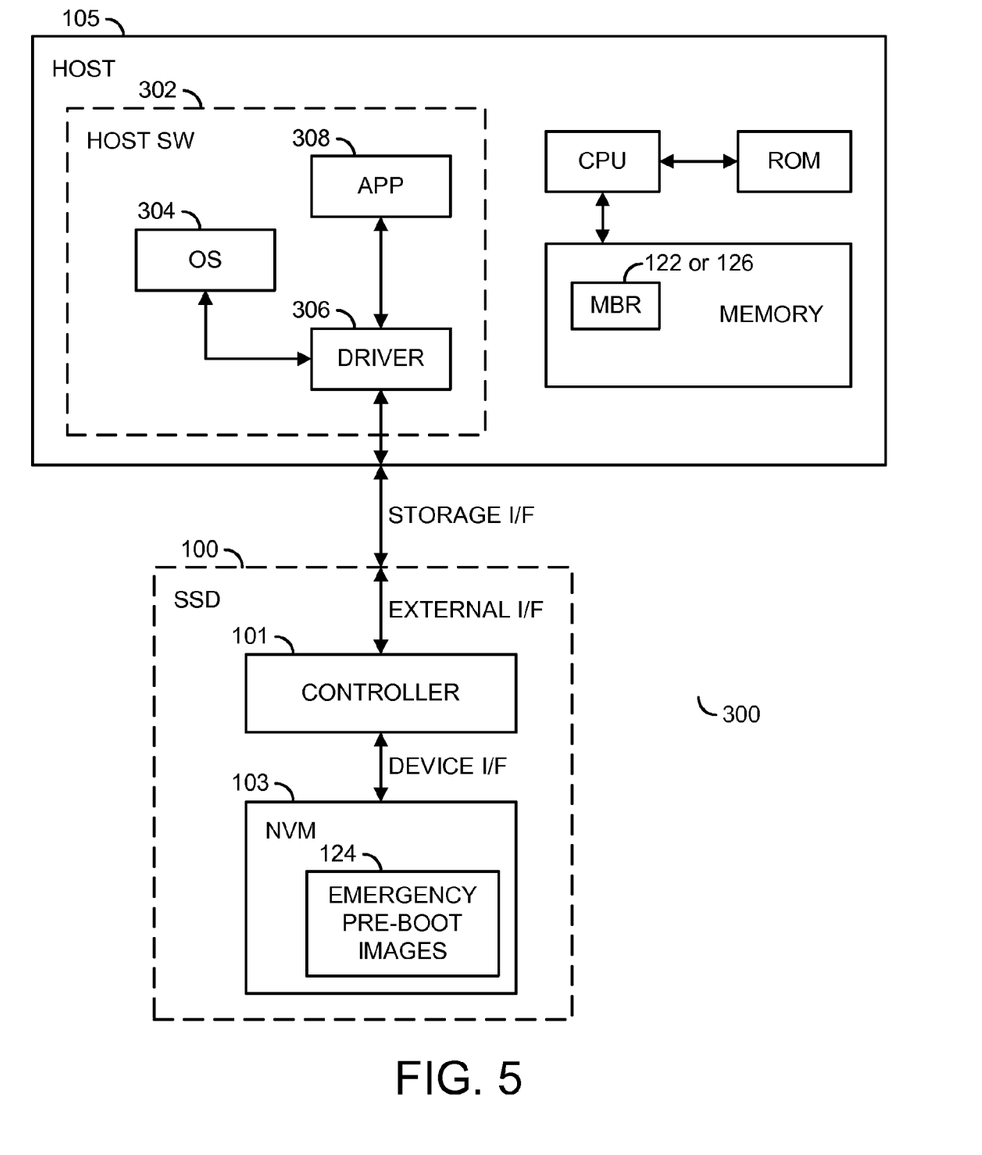
FIG. 5 is a diagram illustrating an example embodiment of a system including an instance of an SSD/non-volatile memory controller in accordance with an embodiment of the invention.

Referring to FIG. 5, a diagram of the host 105 is shown illustrating and an example operation of a system including an instance of the SSD/NVM system 100 of FIG. 1. As an example embodiment of one or more SSDs coupled to a host via various interconnection elements, a single SSD 100 is shown coupled directly to the host 105 via the external interface 114. In some embodiments, the SSD 100 (or variations thereof) corresponds to a SAS (serial attached small computer system interface, or serial SCSI) drive or a SATA (serial advanced technology attachments, or serial ATA) drive that is coupled to an initiator operating as the host 105.

The host 105 is enabled to execute various elements of host software (HOST SW) 302, such as various combinations of operating system (OS) 304, driver software 306, and application software 308. In various embodiments, the OS 304 includes and/or is enabled to operate with drivers (illustrated conceptually by driver 306) for interfacing with the SSD 100. Various versions of Windows (e.g., 95, 98, ME, NT, XP, 2000, Server, Vista, 7, 8, etc.), various versions of Linux (e.g., Red Hat, Debian, Ubuntu, etc.), and various versions of MacOS (e.g., 8, 9, X, etc.) are examples of operating systems that may be used to implement the OS 304. In various embodiments, the drivers 307 are standard and/or generic drivers (sometimes termed "shrink-wrapped" or "pre-installed") operable with a standard interface and/or protocol such as SATA, AHCI, or NVM Express, or are optionally customized and/or vendor specific to enable use of commands specific to the SSD 100.

Some drives and/or drivers have pass-through modes to enable application-level programs, such as application 308 via Optimized NAND Access (sometimes termed ONA) or Direct NAND Access (sometimes termed DNA) techniques, to communicate commands directly to the SSD 100, enabling a customized application to use commands specific to the SSD 100 even with a generic driver. ONA techniques include one or more of: use of non-standard modifiers (hints); use of vendor-specific commands; communication of non-standard statistics, such as actual NVM usage according to compressibility; and other techniques. DNA techniques include one or more of: use of nonstandard commands or vendor-specific providing unmapped read, write, and/or erase access to the NVM; use of non-standard or vendor-specific commands providing more direct access to the NVM, such as by bypassing formatting of data that the I/O device would otherwise do; and other techniques. Examples of the driver 306 are a driver without ONA or DNA support, an ONA-enabled driver, a DNA-enabled driver, and an ONA/DNA-enabled driver. Further examples of the driver 306 are a vendor-provided, vendor-developed, and/or vendor-enhanced driver, and a client-provided, client-developed, and/or client-enhanced driver. Examples of the application-level programs 308 are an application without ONA or DNA support, an ONA-enabled application, a DNA-enabled application, and an ONA/DNA-enabled application.

One or more portions of the NVM MEDIA 103 are used, in some embodiments, for firmware (FW) storage. The firmware storage includes one or more firmware images (or portions thereof). A firmware image has, for example, one or more images of firmware, executed, for example, by the CPU core 172 of the controller 101. A firmware image has, for another example, one or more images of constants, parameter values, and NVM device information, referenced, for example, by the CPU core 172 during the firmware execution. The images of firmware correspond, for example, to a current firmware image and zero or more previous (with respect to firmware updates) firmware images. In various embodiments, the firmware provides for generic, standard, ONA, and/or DNA operating modes. In some embodiments, one or more of the firmware operating modes are enabled (e.g., one or more application program interfaces (APIs) are "unlocked") via keys or various software techniques, optionally communicated and/or provided by a driver.

After a power on self test (POST), the BIOS of the host 105 needs to boot up the OS 304, which may be found on the SSD 100. The actual order in which the BIOS seeks a boot device (e.g., hard drive (HDD), SSD, CD-ROM drive, USB, etc.) is generally user configurable. If no suitable boot device is found, the BIOS halts with a message such as "Non-System DISK or DISK Error." In contrast to a conventional SSD that might present with this symptom when bricked, the emergency pre-boot application (EPBA) 124 contained in the non-user area 118 of the NVM 103 of the SSD 100 can operate through the BIOS of the host 105 to avoid the above result.

When the BIOS of the host 105 is trying to boot the OS 304, the BIOS requests a first portion of data (e.g., a 512 byte sector) from the boot device. The first portion of data is referred to as the master boot record (MBR) and is usually stored at sector zero of a boot partition on the boot device. The MBR generally contains two vital components: a small OS-specific bootstrapping program at the start of the MBR followed by a partition table for the storage device. The BIOS is not aware of the contents of the MBR. The BIOS simply loads the contents of the MBR into host memory at a predefined location and jumps to the predefined location to start executing whatever code is in the MBR.

When the SSD 100 is operating in a normal operating mode, the SSD 100 returns the MBR 122 from the user area 116 in response to the initial read request from the host 105. If a failure occurred following start-up or a reset of the SSD 100, the SSD 100 returns the MBR 126 from the non-user area 118 of the NVM 103, which allows the BIOS of the host 105 to begin loading and executing the emergency pre-boot application 124 instead of halting and giving the message such as "Non-System DISK or DISK Error."

Figure 6:
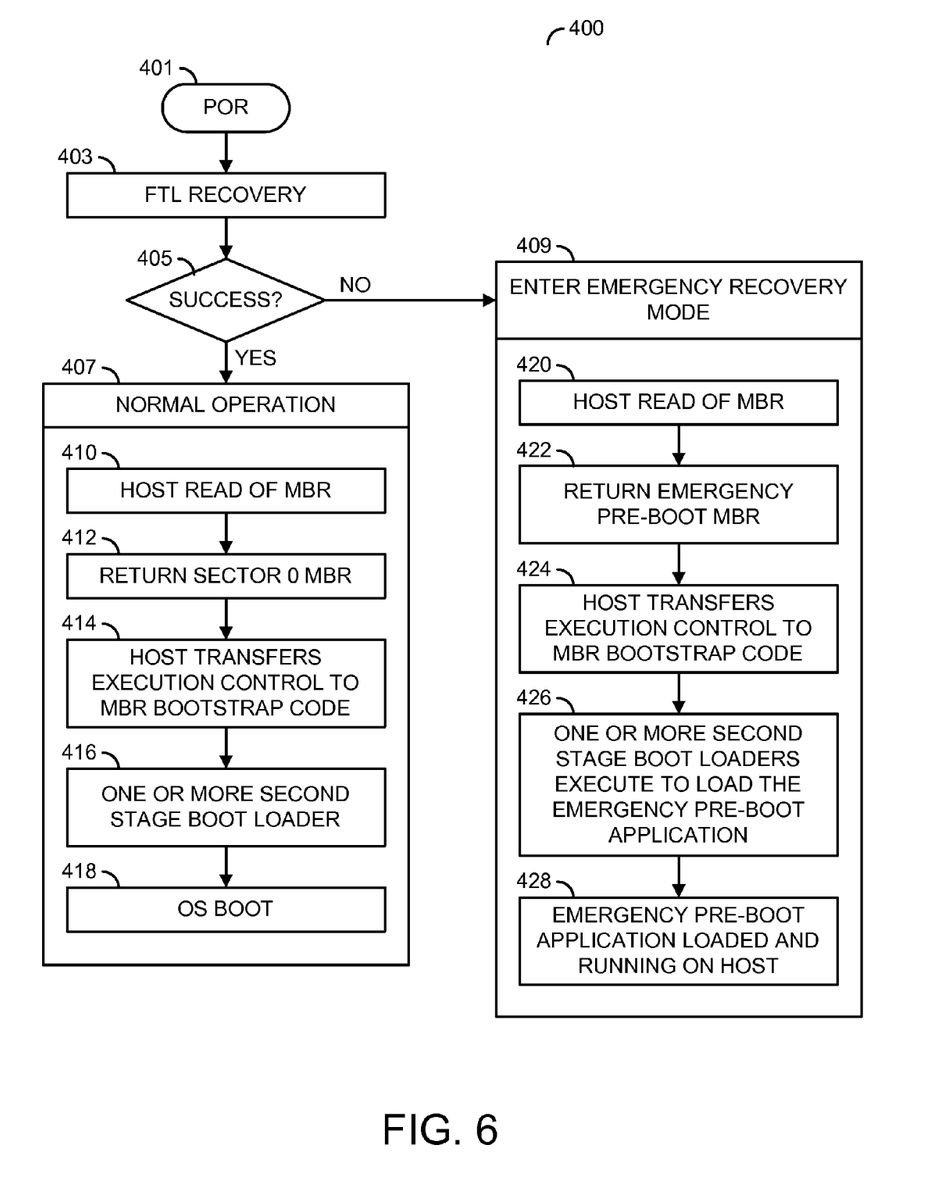
FIG. 6 is a flow diagram illustrating a boot process in accordance with an embodiment of the invention.

Referring to FIG. 6, a flow diagram is shown illustrating a SSD boot process 400 in accordance with an embodiment of the invention. The process (or method) 400 is implemented between the host 105 and the circuits 101 and 103. The method 400 generally comprises a step (or state) 401, a step (or state) 403, a step (or state) 405, a step (or state) 407, a step (or state) 409, a step (or state) 410, a step (or state) 412, a step (or state) 414, a step (or state) 416, a step (or state) 418, a step (or state) 420, a step (or state) 422, a step (or state) 424, a step (or state) 426, and a step (or state) 428. The steps 401 to 428 may represent modules and/or blocks that may be implemented as hardware, software, a combination of hardware and software, or other implementations. The sequence of the steps is shown as a representative example. Other step orders may be implemented to meet the criteria of a particular application.

In some embodiments, following power up or reset of the SSD 100, a host boot, the process 400 starts in the step 401 and moves to the step 403 to recover the flash translation layer (FTL) information for the SSD 100. In a step 405, a determination is made whether recovery of the FTL information was successful. If the FTL was successfully recovered, the process 400 moves to a the step 407 for normal operation. If the FTL recovery was not successful, the process 400 moves to a the step 409 and enters an emergency recovery mode.

In the normal operation mode 407, the process 400 moves to the step 410 to await the initial host read command. Upon receipt of the initial host read command, the process 400 moves to the step 412. In the step 412, the process 400 returns the data (e.g., a MBR) located at the physical location in the NVM corresponding to sector 0, and moves to the step 414. In the step 414, the host transfers execution control to the MBR bootstrap code, and moves to the step 416. In the step 416, one or more second stage boot loaders are retrieved from the SSD 100 by the host 105, and moves to the step 418. In the step 418, the host performs an operating system (OS) boot.

In the emergency recovery mode 409, the process 400 moves to the step 420 to await the initial host read command. Upon receipt of the initial host read command, the process 400 moves to the step 422. In the step 422, the process 400 returns the data (e.g., an EPBA MBR) located in the non-user data portion of the NVM corresponding to the EPBA 124, and moves to the step 424. In the step 424, the host transfers execution control to the MBR bootstrap code, and moves to the step 426. In the step 426, the process 400 executes one or more second stage boot loaders on the host 105 to retrieve the EPBA from the SSD 100, and moves to the step 428. In the step 428, the host performs the EPBA.

Figure 7:
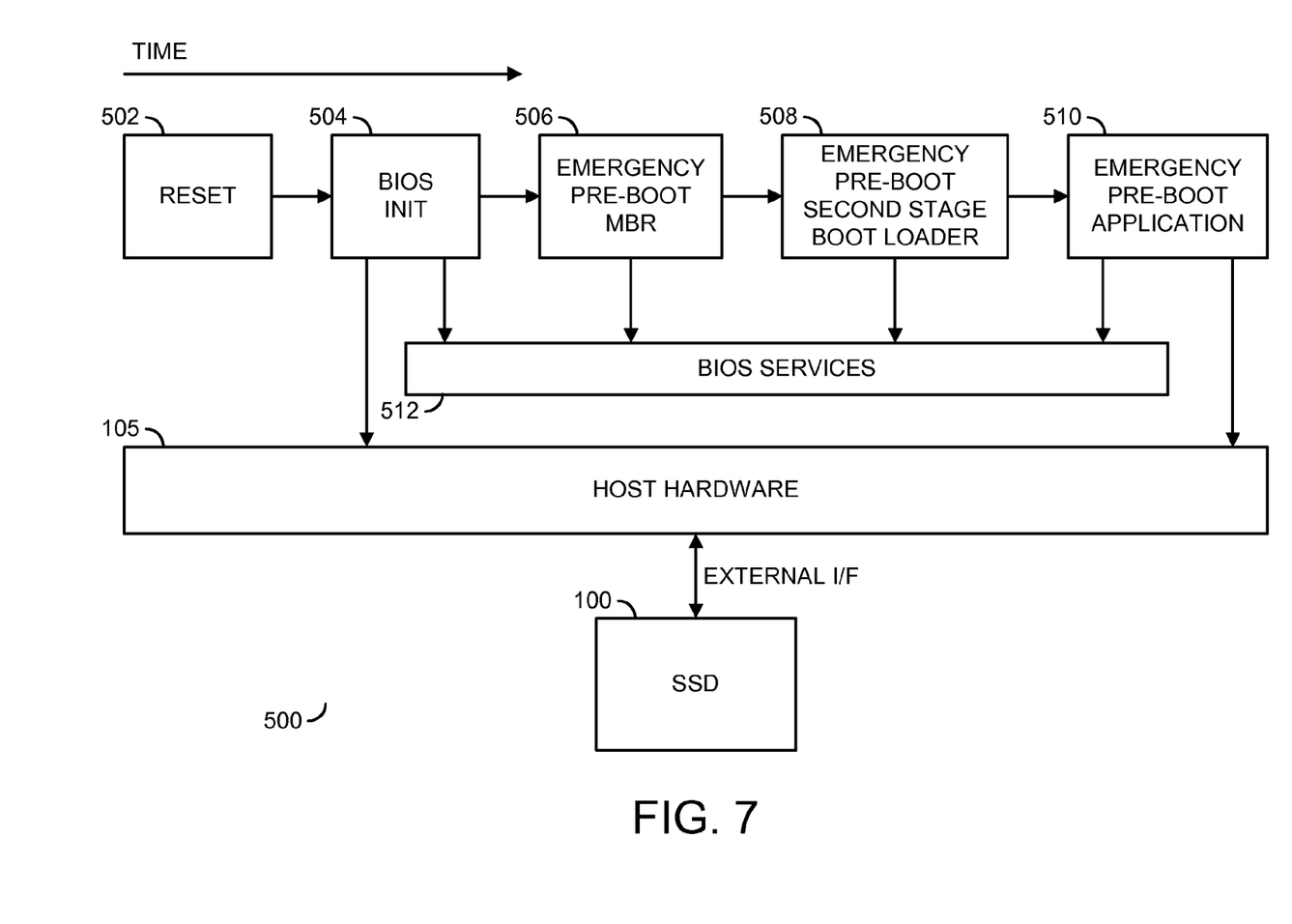
FIG. 7 is a is a flow diagram illustrating an emergency pre-boot application (EPBA) boot sequence in accordance with an embodiment of the invention.

Referring to FIG. 7, a flow diagram of a process 500 is shown illustrating an emergency pre-boot application (EPBA) boot sequence in accordance with an embodiment of the invention. The process (or method) 500 generally begins in a step (or state) 502 where a reset occurs. The process 500 then moves to a step (or state) 504 where system initialization is performed by the BIOS using hardware of the host 105 and BIOS services 512 to load the MBR 126 of the EPBA. The process 500 then moves to a step (or state) 506, where the MBR 126 is executed to load additional portions of a bootstrapping program for the EPBA (e.g., a second stage boot loader, etc.) using the BIOS services 512. The process 500 then moves to a step (or state) 508, where the additional portions of the bootstrapping program for the EPBA are executed to finish loading the EPBA into the memory of the host 105 using the BIOS services 512. The process 500 then moves to a step (or state) 510, where the host 105 executes the EPBA using the hardware of the host and/or the BIOS services 512.

The functions performed by the diagrams of FIGS. 6 and 7 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   a non-volatile memory comprising (i) a user area enabled to store and retrieve data in a logical block address space of a host and (ii) a non-user area storing a failure-specific recovery routine, wherein the failure-specific recovery routine, when executed by the host, uses one or more resources of the host to facilitate one or more recovery operations of the apparatus; and
   a controller communicatively coupled to the non-volatile memory, the controller enabled, when operationally coupled to the host, to respond to host commands to read data from and to write data into the user area of the non-volatile memory, wherein (i) upon successful completion of an internal controller boot process of the apparatus, the controller responds to a read request from the host for a block corresponding to a master boot record by returning a block from the user area corresponding to the master boot record and (ii) upon detection of a predefined failure of the internal controller boot process of the apparatus, the controller ensures communication with the host is established by providing a virtual view of the apparatus that comprises an image of a similar or smaller drive, and responds to the read request from the host for the block corresponding to the master boot record by returning all or a portion of the failure-specific recovery routine stored in the non-user area of the non-volatile memory, enabling the host to perform a recovery process.

2. The apparatus according to claim 1, wherein the failure-specific recovery routine, when executed by the host, utilizes basic input/output system (BIOS) level services of the host to load and execute recovery code that enables the host to perform an enhanced data recovery operation on the apparatus.

3. The apparatus according to claim 1, wherein the failure-specific recovery routine is stored in a root area of the non-volatile memory.

4. The apparatus according to claim 3, wherein the root area of the non-volatile memory is not accessible to the host via the logical block address space.

5. The apparatus according to claim 1, wherein the non-volatile memory and the controller are part of a solid state drive (SSD).

6. The apparatus according to claim 1, wherein the failure-specific recovery routine comprises one or more portions that are loaded into the host according to a predefined boot procedure executed by the host.

7. The apparatus according to claim 1, wherein the failure-specific recovery routine, when executed by the host, performs at least one of directing a user in performing a recovery operation on the apparatus and informing the user of options if data recovery on the apparatus is not successful.

8. A method of recovering from a failure of an internal boot process in a solid-state drive (SSD) comprising:
   partitioning a non-volatile storage medium of the SSD into (i) a user area enabled to store and retrieve data in a logical block address space of a host and (ii) a non-user area storing one or more failure-specific recovery routines, wherein the one or more failure-specific recovery routines, when executed by the host, use one or more resources of the host to facilitate one or more recovery operations of the SSD;
   upon successful completion of the internal boot process of the SSD, responding to host commands to read data from and to write data into the user area of the non-volatile storage medium using a controller communicatively coupled to the non-volatile storage medium, wherein the controller responds to a read request from the host for a block corresponding to a master boot record by returning a block from the user area corresponding to the master boot record; and upon detection of a predefined failure of the internal boot process of the SSD, ensuring communication with the host is established by using the controller coupled to the non-volatile storage medium to provide a virtual view of the SSD comprising an image of a similar or smaller drive, wherein the controller responds to the host read request for the block corresponding to the master boot record by returning at least a portion of one of the one or more failure-specific recovery routines stored in the non-user area of the non-volatile storage medium, enabling the host to perform a recovery process.

9. The method according to claim 8, further comprising:
executing the failure-specific recovery routine on the host, wherein the failure-specific recovery routine utilizes basic input/output system (BIOS) level services of the host to load and execute recovery code that performs at least one of directing a user in performing a recovery operation on the SSD and informing the user of options if data recovery on the SSD is not successful.

10. The method according to claim 8, wherein the step of responding to the host read request following detection of the predefined failure of the internal boot process of the SSD by returning at least a portion of one of the one or more failure-specific recovery routines stored in the non-user area of the non-volatile storage medium further comprises:
transferring a master boot record (MBR) bootstrap code from the non-user area to the host in response to an initial host read request;
transferring execution control to the MBR bootstrap code on the host to load one or more second stage boot loaders from the non-user area of the non-volatile storage medium;
executing the one or more second stage boot loaders on the host to retrieve an emergency pre-boot application (EPBA) from the non-user area of the non-volatile storage medium; and
transferring execution control to the EPBA on the host.

11. A non-volatile computer readable storage medium comprising:
a user area enabled to store and retrieve data in a logical block address space of a host; and
a non-user area storing a failure-specific recovery routine, wherein, when the non-volatile computer readable storage medium is operationally coupled to the host by a controller, upon successful completion of a controller boot process of the controller, host commands to read data from and to write data to the non-volatile computer readable storage medium are responded to by the controller using the user area of the non-volatile computer readable storage medium, and upon detection of a predefined failure of the controller boot process, a host read request for a master boot record is responded to by the controller by providing a virtual view comprising an image of a similar or smaller non-volatile computer readable storage medium in order to ensure communication with the host is established and returning at least a portion of the failure-specific recovery routine stored in the non-user area of the non-volatile computer readable storage medium, enabling the host to perform a recovery process on the non-volatile computer readable storage medium.

12. The non-volatile computer readable storage medium according to claim 11, wherein the failure-specific recovery routine performs at least one of directing a user in performing a recovery operation on the non-volatile computer readable storage medium using one or more resources of the host and informing the user of options if data recovery on the non-volatile computer readable storage medium is not successful.

13. The non-volatile computer readable storage medium according to claim 11, wherein the non-volatile computer readable storage medium is part of a solid-state disk/drive (SSD).

14. The non-volatile computer readable storage medium according to claim 11, wherein the non-volatile computer readable storage medium comprises one or more flash memory die.

15. The non-volatile computer readable storage medium according to claim 14, wherein the non-volatile computer readable storage medium further comprises a portion of read only memory (ROM) embodying a data structure containing the failure-specific recovery routine.

16. The apparatus according to claim 1, wherein:
the failure-specific recovery routine utilizes basic input/output system (BIOS) level services of the host to load and execute recovery code that enables the host to perform the recovery process.

17. The apparatus according to claim 1, wherein the failure-specific recovery routine enables the host to recover a flash translation layer (FTL) for the apparatus.

18. The apparatus according to claim 1, wherein the failure-specific recovery routine enables the host to rebuild a logical to physical address map of the apparatus using self-journaling data written with user data in the user area.

19. The method according to claim 8, wherein the failure-specific recovery routine recovers a flash translation layer of the SSD.

20. The non-volatile computer readable storage medium according to claim 11, wherein the non-user area is only accessible by the controller.

* * * * *